(12) United States Patent
Moisanen et al.

(10) Patent No.: US 11,190,934 B2
(45) Date of Patent: Nov. 30, 2021

(54) INCORRECT KSI HANDLING IN MOBILE COMMUNICATIONS

(71) Applicant: MediaTek Singapore Pte. Ltd., Singapore (SG)

(72) Inventors: Matti Moisanen, Oulu (FI); Jaakko Sitomaniemi, Oulu (FI); Marko Tapani Akselin, Oulu (FI); Jarkko Eskelinen, Oulu (FI); Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 213 days.

(21) Appl. No.: 16/377,481

(22) Filed: Apr. 8, 2019

(65) Prior Publication Data

US 2019/0313250 A1 Oct. 10, 2019

Related U.S. Application Data

(60) Provisional application No. 62/655,319, filed on Apr. 10, 2018, provisional application No. 62/660,280, filed on Apr. 20, 2018.

(51) Int. Cl.
*H04L 29/06* (2006.01)
*H04W 12/0431* (2021.01)
(Continued)

(52) U.S. Cl.
CPC ....... *H04W 12/0431* (2021.01); *H04L 9/0838* (2013.01); *H04L 9/3271* (2013.01); *H04W 12/06* (2013.01)

(58) Field of Classification Search
CPC .... H04L 9/0838; H04L 9/3271; H04W 12/06; H04W 12/04031; H04W 12/0431;
(Continued)

(56) References Cited

U.S. PATENT DOCUMENTS 6,101,380 A * 8/2000 Sollee .................. H04W 12/06 380/248
9,451,455 B2 * 9/2016 Cormier ............. H04L 63/0853
(Continued)

FOREIGN PATENT DOCUMENTS

CN 1870812 A 11/2006
CN 102025685 A 4/2011
(Continued)

OTHER PUBLICATIONS

NPL ETSI TS 133 401 v10.50 (Jul. 2013) (Year: 2013).*
(Continued)

*Primary Examiner* — Malcolm Cribbs
(74) *Attorney, Agent, or Firm* — Han IP PLLC; Andy M. Han (57) ABSTRACT

Various examples pertaining to improvement for incorrect key set identifier (KSI) handling in mobile communications are described. An apparatus (e.g., user equipment) receives from a wireless network an authentication challenge after the processor having completed an authentication and key agreement (AKA) procedure with the wireless network. The apparatus detects an error in the authentication challenge and handles the error in the authentication challenge. For example, the apparatus can reject the authentication challenge responsive to detecting the error. Alternatively, the apparatus can accept the authentication challenge.

17 Claims, 5 Drawing Sheets

(51) Int. Cl.
  *H04L 9/08* (2006.01)
  *H04L 9/32* (2006.01)
  *H04W 12/06* (2021.01)

(58) Field of Classification Search
  CPC ......... H04W 12/0433; H04W 12/0471; H04W 12/062; H04W 12/065; H04W 12/069
  See application file for complete search history.

(56) References Cited

U.S. PATENT DOCUMENTS

| | | | | |
|---|---|---|---|---|
| 9,713,001 | B2* | 7/2017 | Zhang | ............... H04W 12/0401 |
| 2008/0258864 | A1 | 10/2008 | Hattori et al. | |
| 2010/0064135 | A1 | 3/2010 | Thakare et al. | |
| 2010/0172500 | A1* | 7/2010 | Wu | .................. H04W 12/06 |
| | | | | 380/272 |
| 2011/0004754 | A1* | 1/2011 | Walker | ............... H04L 9/0844 |
| | | | | 713/168 |
| 2012/0216039 | A1* | 8/2012 | Franklin | ................. H04L 63/06 |
| | | | | 713/168 |
| 2014/0295797 | A1* | 10/2014 | Moisanen | ......... H04W 12/0802 |
| | | | | 455/411 |
| 2016/0164875 | A1* | 6/2016 | Zhang | ................. H04W 12/06 |
| | | | | 726/4 |
| 2016/0337131 | A1* | 11/2016 | de Andrada | ........ H04L 63/0823 |
| 2017/0006469 | A1* | 1/2017 | Palanigounder | ...... H04L 9/0891 |
| 2017/0118643 | A1* | 4/2017 | Bergius | ................. H04L 9/3226 |
| 2017/0134444 | A1 | 5/2017 | Buckley et al. | |
| 2018/0013568 | A1* | 1/2018 | Muhanna | .............. H04L 9/0825 |

FOREIGN PATENT DOCUMENTS

| | | | | |
|---|---|---|---|---|
| CN | 102934470 | A | | 2/2013 |
| CN | 103781069 | A * | 5/2014 | ............ H04W 12/06 |
| CN | 106304056 | A | | 1/2017 |
| CN | 106717044 | A | | 5/2017 |
| WO | WO 2014113193 | A1 | | 7/2014 |

OTHER PUBLICATIONS

China National Intellectual Property Administration, International Search Report and Written Opinion for International Patent Application No. PCT/CN2019/081766, dated Jul. 8, 2019.
Taiwan Intellectual Property Office, Office Action for Taiwan Patent Application No. 108112166, dated Feb. 27, 2020.
China National Intellectual Property Administration, Office Action for China Patent Application No. 201980001741.2, dated Sep. 2, 2021.

* cited by examiner

```
RECEIVE, BY A PROCESSOR OF AN APPARATUS, FROM A
WIRELESS NETWORK AN AUTHENTICATION CHALLENGE AFTER
THE PROCESSOR HAVING COMPLETED AN AUTHENTICATION
AND KEY AGREEMENT (AKA) PROCEDURE WITH THE
WIRELESS NETWORK
310
```

```
DETECT, BY THE PROCESSOR, AN ERROR IN THE
AUTHENTICATION CHALLENGE
320
```

```
REJECT, BY THE PROCESSOR, THE AUTHENTICATION
CHALLENGE RESPONSIVE TO DETECTING THE ERROR
330
```

RECEIVE, BY A PROCESSOR OF AN APPARATUS, FROM A WIRELESS NETWORK AN AUTHENTICATION CHALLENGE AFTER THE PROCESSOR HAVING COMPLETED AN AUTHENTICATION AND KEY AGREEMENT (AKA) PROCEDURE WITH THE WIRELESS NETWORK
510

DETECT, BY THE PROCESSOR, AN ERROR IN THE AUTHENTICATION CHALLENGE
520

HANDLE, BY THE PROCESSOR, THE ERROR IN THE AUTHENTICATION CHALLENGE
530

FIG. 5

United States Patent US 11,190,934 B2

INCORRECT KSI HANDLING IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/655,319 and 62/660,280, filed on 10 Apr. 2018 and 20 Apr. 2018, respectively. The contents of aforementioned applications are herein incorporated by reference in their entirety.

TECHNICAL FIELD

The present disclosure is generally related to mobile communications and, more particularly, to improvement for incorrect key set identifier (KSI) handling in mobile communications.

BACKGROUND

Unless otherwise indicated herein, approaches described in this section are not prior art to the claims listed below and are not admitted as prior art by inclusion in this section.

According to the current $3^{rd}$-Generation Partnership Project (3GPP) specification for $5^{th}$-Generation (5G) New Radio (NR) mobile communications, the 5G security context is indicated by a key set identifier for 5G (ngKSI). A user equipment (UE) and a network can have valid native or mapped 5G security context stored. This can be used to secure non-access stratum (NAS) messages when a new call-initiated (N1) NAS signaling connection is established.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus receiving, from a wireless network, an authentication challenge after the processor having completed an authentication and key agreement (AKA) procedure with the wireless network. The method may also involve the processor detecting an error in the authentication challenge. The method may further involve the processor rejecting the authentication challenge responsive to detecting the error.

In one aspect, a method may involve a processor of an apparatus receiving, from a wireless network, an authentication challenge after the processor having completed an authentication and key agreement (AKA) procedure with the wireless network. The method may also involve the processor detecting an error in the authentication challenge. The method may further involve the processor accepting the authentication challenge.

In one aspect, a method may involve a processor of an apparatus receiving, from a wireless network, an authentication challenge after the processor having completed an authentication and key agreement (AKA) procedure with the wireless network. The method may also involve the processor detecting an error in the authentication challenge. The method may further involve the processor handling the error in the authentication challenge.

It is noteworthy that, although description provided herein may be in the context of certain radio access technologies, networks and network topologies such as New Radio (NR) or non-3GPP access in 5G system, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

According to the 3GPP specification, if an ngKSI is contained in an initial NAS message during a 5G Mobility Management (5GMM) procedure, a 5G NR mobile network is to include a different ngKSI value in an authentication request message when the network initiates a 5G authentication and key agreement (AKA)-based primary authentication and key agreement procedure. Moreover, according to the 3GPP specification, if the 5G AKA-based primary authentication and key agreement procedure has been completed successfully and the related ngKSI is stored in the 5G System (5GS) security context of the network, the network is to include a different ngKSI value in the authentication request message when the network initiates a new 5G AKA-based primary authentication and key agreement procedure.

Additionally, according to the 3GPP specification, the UE can reject a 5G authentication challenge sent by the network if the UE detects authentication challenge parameters to be incorrect. That is, the UE may reject the core network due to an incorrect authentication challenge parameter such as, for example, medium access control (MAC) code failure, non-Evolved Packet System (non-EPS) authentication not accepted (e.g., incorrect "separate bit"), synchronization failure (e.g., SQN failure). However, in such cases, the UE has no means to reject the authentication if the KSI received from the network is already in use in the UE.

Besides, it has been detected in the field that in some cases, albeit rarely, the network can start an authentication challenge with a key set identifier for E-UTRAN (eKSI) that was already in use in the UE. This can happen if the network has lost the security context of the UE (e.g., due to error in location updating or network element restart). In such cases, the network has no means to know what the security context is or the eKSI used before with respect to the UE.

As can be seen, there is currently no standardized way for the UE to overcome the error caused by overlapping KSIs. Accordingly, multiple solutions and/or schemes are proposed in the present disclosure to address this issue.

Figure 1:
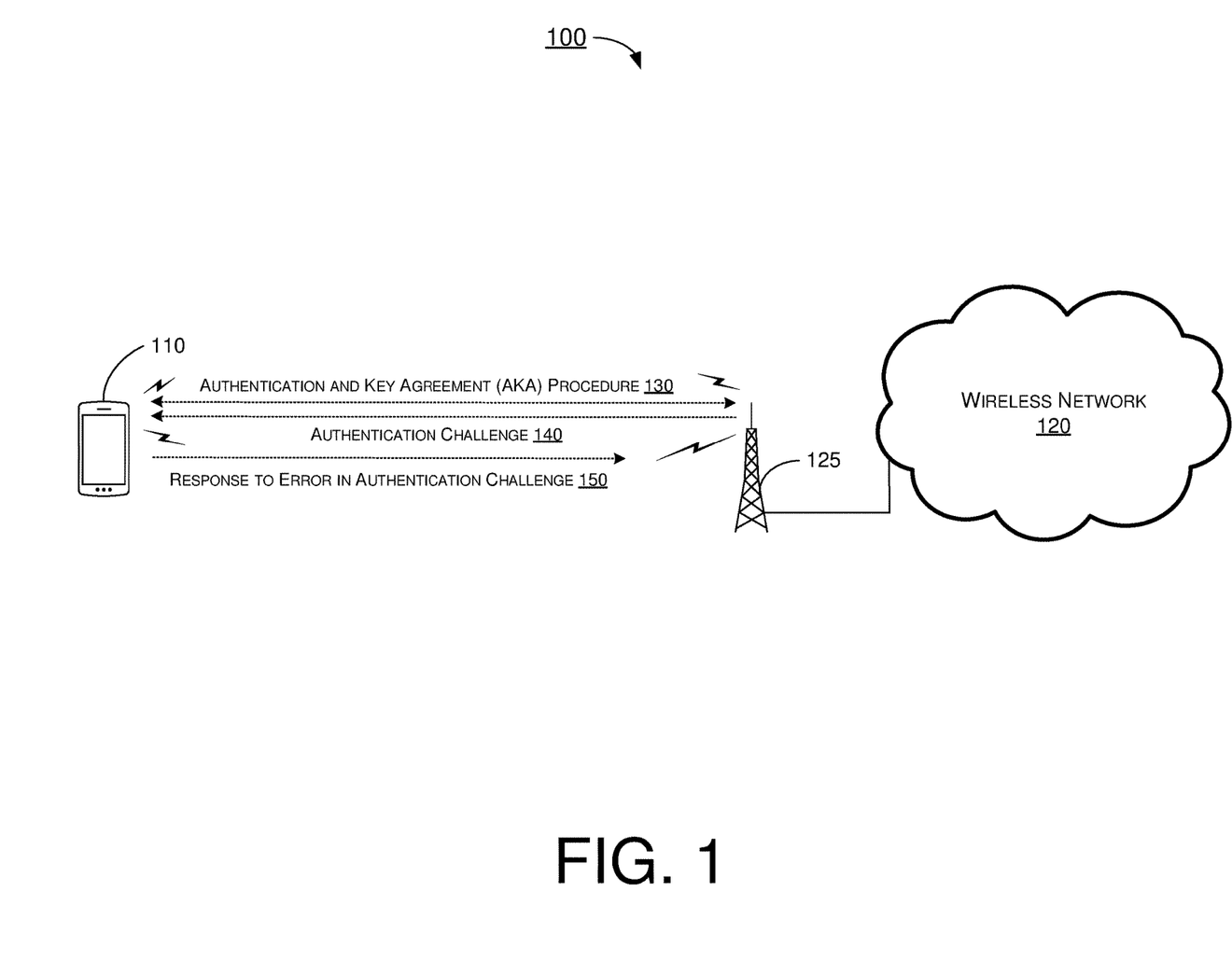
FIG. 1 is a diagram of an example scenario in which various solutions in accordance with the present disclosure may be implemented.

FIG. 1 illustrates an example scenario 100 in which various solutions in accordance with the present disclosure may be implemented. Referring to FIG. 1, scenario 100 may involve a user equipment (UE) 110 in wireless communication with a wireless network 120 (e.g., a 5G NR mobile network) via a base station 125 (e.g., a gNB or transmit-receive point (TRP)). In scenario 100, initially UE 110 and wireless network 120 may have successfully performed and completed an authentication and key agreement (AKA) procedure 130. Subsequently, UE 110 may perform a procedure with wireless network 120 that causes or otherwise triggers wireless network 120 to transmit an authentication challenge 140 to UE 110 via base station 125. Upon receiving the authentication challenge 140 from wireless network 120, UE 110 may detect an error in the authentication challenge 140 (e.g., an incorrect KSI in authentication challenge 140 or that the KSI is already in use by UE 110). In response, UE 110 may handle the error in authentication challenge 140 based on one or more of various solutions in accordance with the present disclosure. For instance, in handling the error, UE 110 may transmit a response 150 to wireless network 120 to either reject or accept authentication challenge 140. The follow description of various solutions in accordance with the present disclosure is provided with reference to FIG. 1.

Under a first proposed solution in accordance with the present disclosure, upon receiving an authentication challenge with an incorrect KSI from wireless network 120, UE 110 may reject the authentication challenge by responding with a message indicating authentication failure with a new cause value. The new cause value may indicate, for example and without limitation, that the KSI in the authentication challenge from wireless network 120 is incorrect, that the KSI is already in use by UE 110 or that a security context is invalid. Advantageously, such indication may cause wireless network 120 to restart the authentication challenge with a different KSI value. Moreover, under the first proposed solution, upon occurrence of authentication failure, UE 110 may store received authentication parameters (e.g., with optional information elements) despite incorrect KSI. In such cases, wireless network 120 would need to transmit a new KSI while there is no need for wireless network 120 to transmit the same authentication parameters again.

Under a second proposed solution in accordance with the present disclosure, upon receiving an authentication challenge with an incorrect KSI from wireless network 120, UE 110 may transmit a response to the authentication challenge with 5GMM status. The 5GMM status may have an existing cause value or a new cause value which may indicate, for example and without limitation, that the KSI in the authentication challenge from wireless network 120 is incorrect, that the KSI is already in use by UE 110 or that a security context is invalid.

Under a third proposed solution in accordance with the present disclosure, upon receiving an authentication challenge with an incorrect KSI from wireless network 120, UE 110 may perform one or more operations. For instance, UE 110 may abort a procedure that triggered the authentication challenge. Additionally, or alternatively, UE 110 may delete a current security context. Additionally, or alternatively, UE 110 may perform either of: (a) restarting the procedure that triggered the authentication challenge; and (b) initiating a registration procedure with an indication to wireless network 120 that no key is available. In deleting the current security context (e.g., deleting an ngKSI), UE 110 may set the ngKSI to the value of "no key is available" and consider also an associated key $K_{AMF}$ or $K'_{AMF}$, 5G NAS ciphering key and 5G NAS integrity key invalid. That is, the 5G security context associated with the ngKSI may be no longer considered valid.

Under a fourth proposed solution in accordance with the present disclosure, upon receiving an authentication challenge with an incorrect KSI from wireless network 120, UE 110 may accept the authentication challenge. For instance, UE 110 may clear an existing KSI and a related security context. Additionally, UE 110 may accept an overlapping KSI provided by an Access and Mobility management Function (AMF). In some cases, in accepting the authentication challenge, UE 110 may perform a security mode control (SMC) procedure with wireless network 120 with a new security context. Moreover, UE 110 may transmit an authentication response to wireless network 120.

Under a fifth proposed solution in accordance with the present disclosure, upon receiving an authentication challenge with an incorrect KSI from wireless network 120, UE 110 may accept the authentication challenge by rejecting an upcoming SMC procedure with wireless network 120. For instance, UE 110 may transmit to wireless network 120 a response with a cause value indicating rejection of the upcoming SMC procedure.

Illustrative Implementations

Figure 2:
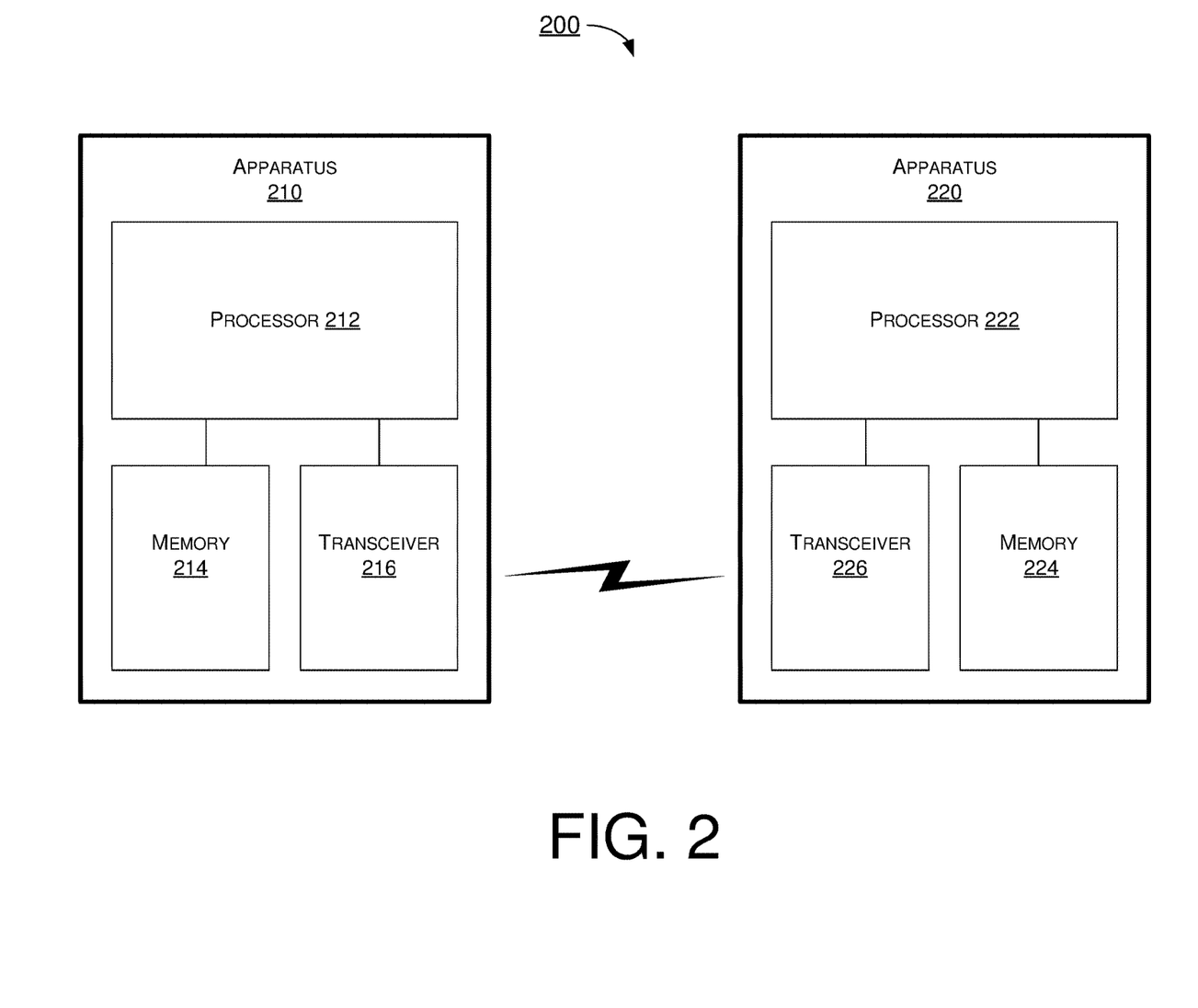
FIG. 2 is a block diagram of an example communication system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to improvement for incorrect KSI handling in mobile communications, including the various schemes described above with respect to various proposed designs, concepts, schemes, systems and methods described above, including scenario 100, as well as processes 300, 400 and 500 described below.

Each of apparatus 210 and apparatus 220 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to improvement for incorrect KSI handling in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 210 as a UE (e.g., UE 110), the same is also applicable to apparatus 220 as a network node or base station such as a gNB, TRP or eNodeB (e.g., network node 125) of a wireless network (e.g., wireless network 120) such as a 5G NR mobile network.

Under various proposed solutions in accordance with the present disclosure, processor 212 of apparatus 210 may receive, via transceiver 216, from apparatus 220 an authentication challenge after the processor having completed an authentication and key agreement (AKA) procedure with apparatus 220. Moreover, processor 212 may detect an error in the authentication challenge. Furthermore, processor 212 may handle the error in the authentication challenge.

In some implementations, in handling the error in the authentication challenge, processor 212 may reject the authentication challenge by transmitting, via transceiver 216, to apparatus 220 a response to indicate authentication failure. In such cases, the response may include a cause value indicating that a first KSI in the authentication challenge is incorrect or that the first KSI is already in use.

In some implementations, in handling the error in the authentication challenge, processor 212 may store, in memory 214, one or more parameters associated with the authentication challenge despite the first KSI in the authentication challenge being incorrect or already in use. In some implementations, the one or more parameters may include optional information elements.

In some implementations, in handling the error in the authentication challenge, processor 212 may perform additional operations. For instance, processor 212 may receive, via transceiver 216, from apparatus 220 a subsequent authentication challenge with a second KSI different than the first KSI. Moreover, processor 212 may perform a new AKA procedure with apparatus 220 responsive to receiving the subsequent authentication challenge with the second KSI.

In some implementations, in handling the error in the authentication challenge, processor 212 may transmit, via transceiver 216, to apparatus 220 a response to the authentication challenge with 5GMM status having an existing cause value or a new cause value indicating that a KSI in the authentication challenge is incorrect, that the KSI is already in use or that a security context is invalid.

In some implementations, in handling the error in the authentication challenge, processor 212 may perform multiple operations. For instance, processor 212 may abort a procedure that triggered the authentication challenge. Additionally, processor 212 may delete a current security context. Furthermore, processor 212 may perform either: (a) restarting the procedure that triggered the authentication challenge; or (b) initiating a registration procedure with an indication to the wireless network that no key is available.

In some implementations, in handling the error in the authentication challenge, processor 212 may accept the authentication challenge. In some implementation, in accepting the authentication challenge, processor 212 may perform multiple operations. For instance, processor 212 may clear an existing KSI and a related security context. Moreover, processor 212 may accept an overlapping KSI provided by an AMF. Furthermore, processor 212 may transmit, via transceiver 216, an authentication response to apparatus 220. In some implementations, in accepting the authentication challenge, processor 212 may also perform an SMC procedure with apparatus 220 with a new security context.

In some implementations, in accepting the authentication challenge, processor 212 may reject an upcoming SMC procedure with apparatus 220 by transmitting, via transceiver 216, to apparatus 220 a response with a cause value indicating rejection of the upcoming SMC procedure.

Illustrative Processes

Figure 3:
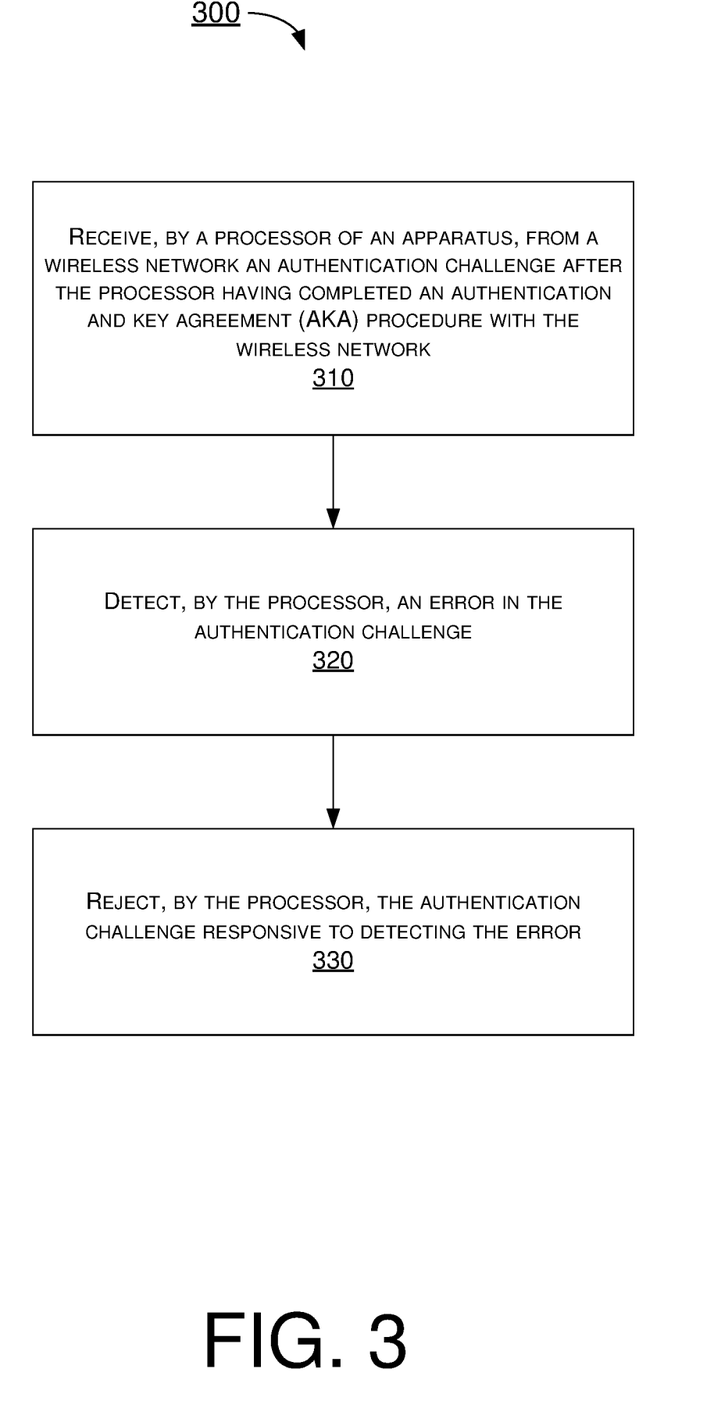
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including scenario 100. More specifically, process 300 may represent an aspect of the proposed concepts and schemes pertaining to improvement for incorrect KSI handling in mobile communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a network node or base station (e.g., network node 125) of a wireless network (e.g., wireless network 120). Process 300 may begin at block 310.

At 310, process 300 may involve processor 212 of apparatus 210 receiving, via transceiver 216, from apparatus 220 an authentication challenge after the processor having completed an authentication and key agreement (AKA) procedure with apparatus 220. Process 300 may proceed from 310 to 320.

At 320, process 300 may involve processor 212 detecting an error in the authentication challenge. Process 300 may proceed from 320 to 330.

At 330, process 300 may involve processor 212 rejecting the authentication challenge responsive to detecting the error.

In some implementations, in rejecting the authentication challenge, process 300 may involve processor 212 transmitting, via transceiver 216, to apparatus 220 a response to indicate authentication failure. In some implementations, the response may include a cause value indicating that a KSI in the authentication challenge is incorrect or that the KSI is already in use.

In some implementations, process 300 may further involve processor 212 storing, in memory 214, one or more parameters associated with the authentication challenge despite a first KSI in the authentication challenge being incorrect or already in use. In some implementations, the one or more parameters may include optional information elements.

In some implementations, process 300 may also involve processor 212 receiving, via transceiver 216, from apparatus 220 a subsequent authentication challenge with a second KSI different than the first KSI. Additionally, process 300 may involve processor 212 performing a new AKA procedure responsive to receiving the subsequent authentication challenge with the second KSI.

Figure 4:
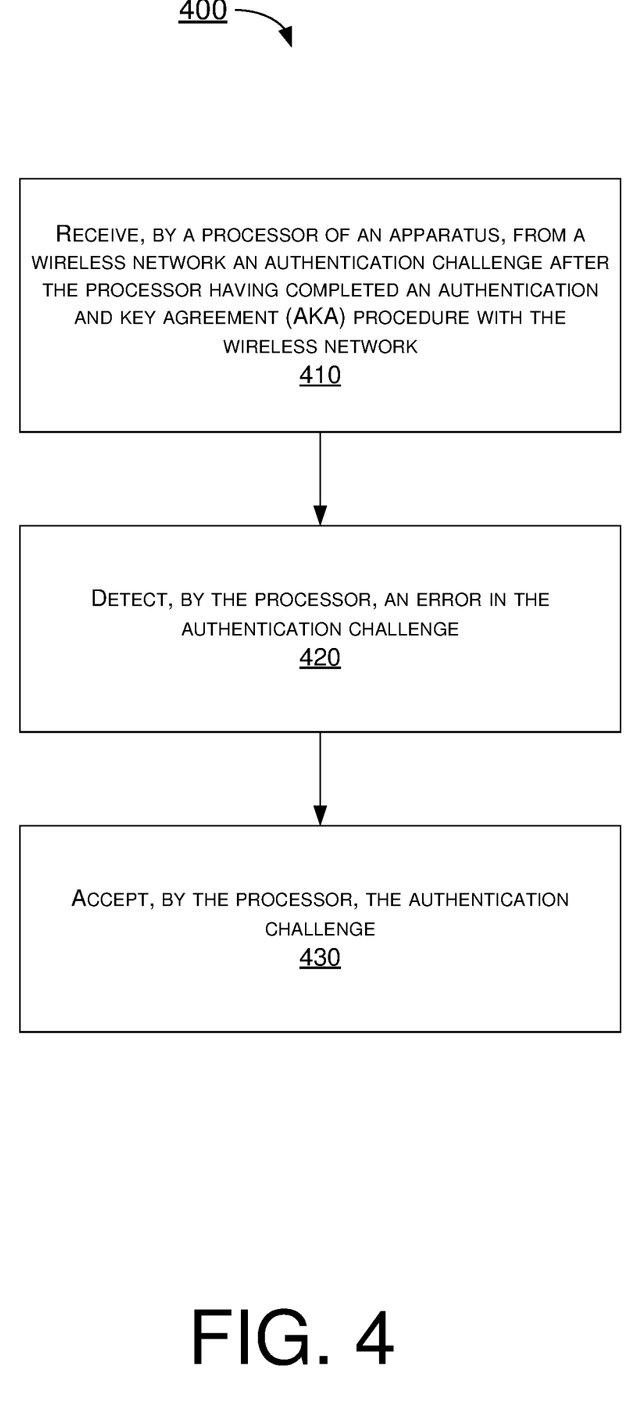
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including scenario 100. More specifically, process 400 may represent an aspect of the proposed concepts and schemes pertaining to improvement for incorrect KSI handling in mobile communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a network node or base station (e.g., network node 125) of a wireless network (e.g., wireless network 120). Process 400 may begin at block 410.

At 410, process 400 may involve processor 212 of apparatus 210 receiving, via transceiver 216, from apparatus 220 an authentication challenge after the processor having completed an authentication and key agreement (AKA) procedure with apparatus 220. Process 400 may proceed from 410 to 420.

At 420, process 400 may involve processor 212 detecting an error in the authentication challenge. Process 400 may proceed from 420 to 430.

At 430, process 400 may involve processor 212 accepting the authentication challenge despite the error.

In some implementations, in detecting the error in the authentication challenge, process 400 may involve processor 212 detecting that a KSI in the authentication challenge is incorrect or that the KSI is already in use.

In some implementations, in accepting the authentication challenge, process 400 may involve processor 212 performing multiple operations. For instance, process 400 may involve processor 212 clearing an existing KSI and a related security context. Additionally, process 400 may involve processor 212 accepting an overlapping KSI provided by an Access and Mobility management Function (AMF). Moreover, process 400 may involve processor 212 transmitting, via transceiver 216, an authentication response to apparatus 220.

In some implementations, in accepting the authentication challenge, process 400 may further involve processor 212 performing an SMC procedure with apparatus 220 with a new security context.

In some implementations, in accepting the authentication challenge, process 400 may involve processor 212 rejecting an upcoming SMC procedure with apparatus 220 by transmitting to apparatus 220 a response with a cause value indicating rejection of the upcoming SMC procedure.

Figure 5:
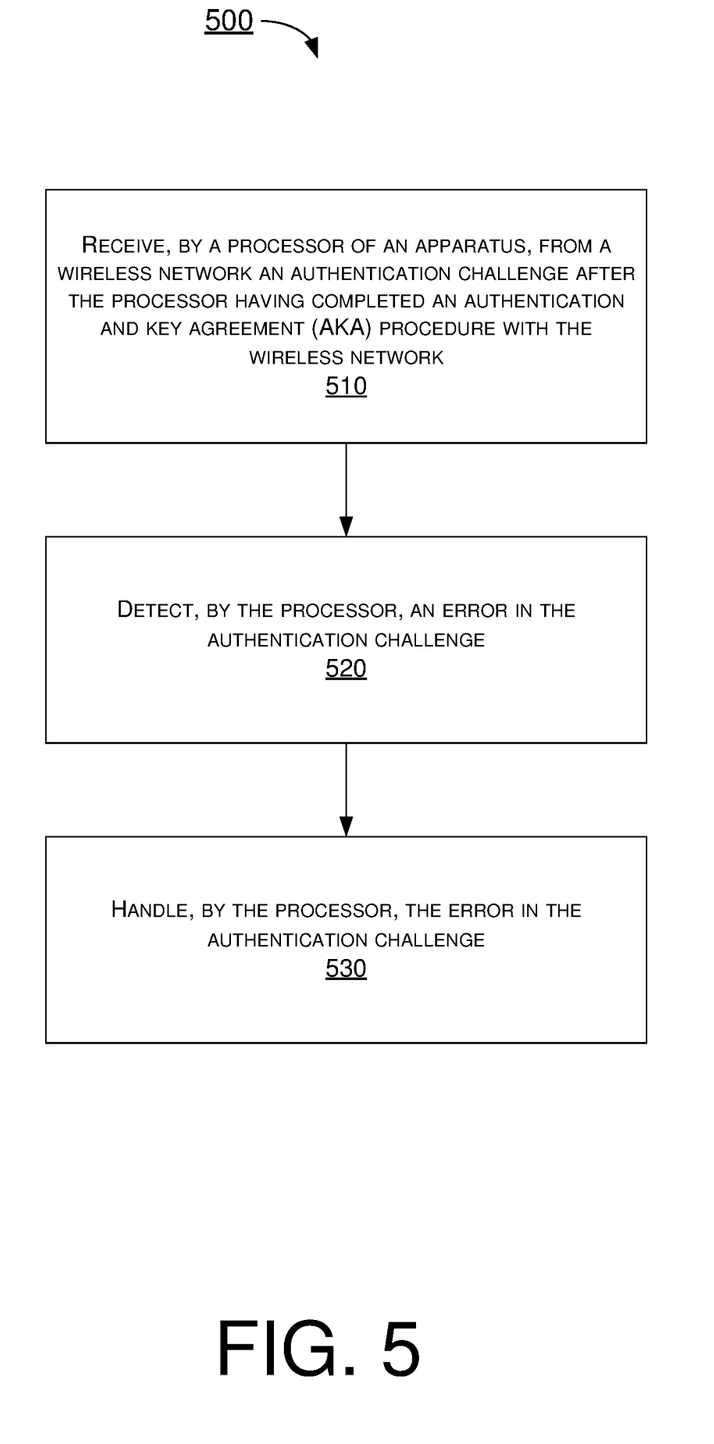
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including scenario 100. More specifically, process 500 may represent an aspect of the proposed concepts and schemes pertaining to improvement for incorrect KSI handling in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 210 and apparatus 220 as well as any variations thereof. Solely for illustrative purposes and without limiting the scope, process 500 is described below in the context of apparatus 210 as a UE (e.g., UE 110) and apparatus 220 as a network node or base station (e.g., network node 125) of a wireless network (e.g., wireless network 120). Process 500 may begin at block 510.

At 510, process 500 may involve processor 212 of apparatus 210 receiving, via transceiver 216, from apparatus 220 an authentication challenge after the processor having completed an authentication and key agreement (AKA) procedure with apparatus 220. Process 500 may proceed from 510 to 520.

At 520, process 500 may involve processor 212 detecting an error in the authentication challenge. Process 500 may proceed from 520 to 530.

At 530, process 500 may involve processor 212 handling the error in the authentication challenge.

In some implementations, in handling the error in the authentication challenge, process 500 may involve processor 212 rejecting the authentication challenge by transmitting, via transceiver 216, to apparatus 220 a response to indicate authentication failure. In such cases, the response may include a cause value indicating that a first KSI in the authentication challenge is incorrect or that the first KSI is already in use.

In some implementations, in handling the error in the authentication challenge, process 500 may further involve processor 212 storing, in memory 214, one or more parameters associated with the authentication challenge despite the first KSI in the authentication challenge being incorrect or already in use. In some implementations, the one or more parameters may include optional information elements.

In some implementations, in handling the error in the authentication challenge, process 500 may involve processor 212 performing additional operations. For instance, process 500 may involve processor 212 receiving, via transceiver 216, from apparatus 220 a subsequent authentication challenge with a second KSI different than the first KSI. Moreover, process 500 may involve processor 212 performing a new AKA procedure responsive to receiving the subsequent authentication challenge with the second KSI.

In some implementations, in handling the error in the authentication challenge, process 500 may involve processor 212 transmitting, via transceiver 216, to apparatus 220 a response to the authentication challenge with 5GMM status having an existing cause value or a new cause value indicating that a KSI in the authentication challenge is incorrect, that the KSI is already in use or that a security context is invalid.

In some implementations, in handling the error in the authentication challenge, process 500 may involve processor 212 performing multiple operations. For instance, process 500 may involve processor 212 aborting a procedure that triggered the authentication challenge. Additionally, process 500 may involve processor 212 deleting a current security context. Furthermore, process 500 may involve processor 212 performing either: (a) restarting the procedure that triggered the authentication challenge; or (b) initiating a registration procedure with an indication to the wireless network that no key is available.

In some implementations, in handling the error in the authentication challenge, process 500 may involve processor 212 accepting the authentication challenge. In some implementation, in accepting the authentication challenge, process 500 may involve processor 212 performing multiple operations. For instance, process 500 may involve processor 212 clearing an existing KSI and a related security context. Moreover, process 500 may involve processor 212 accepting an overlapping KSI provided by an AMF. Furthermore, process 500 may involve processor 212 transmitting, via transceiver 216, an authentication response to apparatus 220. In some implementations, in accepting the authentication challenge, process 500 may further involve processor 212 performing an SMC procedure with apparatus 220 with a new security context.

In some implementations, in accepting the authentication challenge, process 500 may involve processor 212 rejecting an upcoming SMC procedure with apparatus 220 by transmitting, via transceiver 216, to apparatus 220 a response with a cause value indicating rejection of the upcoming SMC procedure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus implemented in a user equipment (UE), from a $5^{th}$ Generation (5G) wireless network a non-access stratum (NAS) authentication challenge after the processor having completed an authentication and key agreement (AKA) procedure with the wireless network;
   detecting, by the processor, a failure in the NAS authentication challenge, wherein the failure comprises a key set identifier (KSI) for Next Generation Radio Access Network (ngKSI) received in the authentication challenge being already in use in the UE; and
   rejecting, by the processor, the NAS authentication challenge responsive to detecting the failure by transmitting to the wireless network a response indicating that the ngKSI is already in use.

2. The method of claim 1, further comprising:
   storing, by the processor, one or more parameters associated with the NAS authentication challenge despite a first ngKSI in the authentication challenge being incorrect or already in use,
   wherein the one or more parameters comprise optional information elements.

3. The method of claim 2, further comprising:
   receiving, by the processor, from the wireless network a subsequent NAS authentication challenge with a second KSI different than the first KSI; and
   performing, by the processor, a new AKA procedure responsive to receiving the subsequent NAS authentication challenge with the second KSI.

4. A method, comprising:
   receiving, by a processor of an apparatus implemented in a user equipment (UE), from a $5^{th}$ Generation (5G) wireless network a non-access stratum (NAS) authentication challenge after the processor having completed an authentication and key agreement (AKA) procedure with the wireless network;

detecting, by the processor, a failure in the NAS authentication challenge; and accepting, by the processor, the authentication challenge, wherein the detecting of the failure in the NAS authentication challenge comprises detecting that a key set identifier (KSI) for Next Generation Radio Access Network (ngKSI) in the authentication challenge is incorrect.

5. The method of claim 4, wherein the accepting of the authentication challenge comprises:

clearing an existing ngKSI and a related security context;

accepting an overlapping ngKSI provided by an Access and Mobility management Function (AMF); and transmitting an authentication response to the wireless network.

6. The method of claim 5, wherein the accepting of the NAS authentication challenge further comprises performing a security mode control (SMC) procedure with the wireless network with a new security context.

7. The method of claim 4, wherein the accepting of the NAS authentication challenge comprises rejecting an upcoming security mode control (SMC) procedure with the wireless network by transmitting to the wireless network a response with a cause value indicating rejection of the upcoming SMC procedure.

8. A method, comprising:

receiving, by a processor of an apparatus implemented in a user equipment (UE), from a $5^{th}$ Generation (5G) wireless network a non-access stratum (NAS) authentication challenge after the processor having completed an authentication and key agreement (AKA) procedure with the wireless network;

detecting, by the processor, a failure in the NAS authentication challenge, wherein the failure comprises a key set identifier (KSI) for Next Generation Radio Access Network (ngKSI) received in the authentication challenge being already in use in the UE; and handling, by the processor, the failure in the authentication challenge, wherein the handling of the failure in the NAS authentication challenge comprises rejecting the authentication challenge by transmitting to the wireless network a response indicating that the ngKSI is already in use.

9. The method of claim 8, wherein the handling of the failure in the authentication challenge comprises rejecting the NAS authentication challenge by transmitting to the wireless network a response to indicate authentication failure, and wherein the response comprises a cause value indicating that a first ngKSI in the NAS authentication challenge is incorrect or that the first ngKSI is already in use.

10. The method of claim 9, wherein the handling of the failure in the NAS authentication challenge further comprises:

storing one or more parameters associated with the NAS authentication challenge despite the first ngKSI in the NAS authentication challenge being incorrect or already in use, wherein the one or more parameters comprise optional information elements.

11. The method of claim 10, wherein the handling of the failure in the authentication challenge further comprises:

receiving from the wireless network a subsequent NAS authentication challenge with a second ngKSI different than the first ngKSI; and performing a new AKA procedure responsive to receiving the subsequent NAS authentication challenge with the second ngKSI.

12. The method of claim 8, wherein the handling of the failure in the NAS authentication challenge comprises transmitting to the wireless network a response to the authentication challenge with 5th-Generation Mobility Management (5GMM) status having an existing cause value or a new cause value indicating that a ngKSI in the NAS authentication challenge is incorrect, that the ngKSI is already in use or that a security context is invalid.

13. The method of claim 8, wherein the handling of the failure in the authentication challenge comprises:

aborting a procedure that triggered the NAS authentication challenge;

deleting a current security context; and performing either:

restarting the procedure that triggered the NAS authentication challenge; or initiating a registration procedure with an indication to the wireless network that no key is available.

14. The method of claim 8, wherein the handling of the failure in the NAS authentication challenge comprises accepting the NAS authentication challenge.

15. The method of claim 14, wherein the accepting of the NAS authentication challenge comprises:

clearing an existing ngKSI and a related security context;

accepting an overlapping ngKSI provided by an Access and Mobility management Function (AMF); and transmitting an authentication response to the wireless network.

16. The method of claim 15, wherein the accepting of the NAS authentication challenge further comprises performing a security mode control (SMC) procedure with the wireless network with a new security context.

17. The method of claim 14, wherein the accepting of the NAS authentication challenge comprises rejecting an upcoming security mode control (SMC) procedure with the wireless network by transmitting to the wireless network a response with a cause value indicating rejection of the upcoming SMC procedure.

* * * * *